United States Patent
Du

(10) Patent No.: US 6,351,477 B1
(45) Date of Patent: Feb. 26, 2002

(54) OPTICALLY PUMPED INTENSIFYING AGENT, IN PARTICULAR A SOLID INTENSIFYING AGENT

(75) Inventor: Keming Du, D-Aachen (DE)

(73) Assignee: Fraunhofer Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/117,749

(22) PCT Filed: Jan. 30, 1997

(86) PCT No.: PCT/EP97/00410

§ 371 Date: Aug. 6, 1998

§ 102(e) Date: Aug. 6, 1998

(87) PCT Pub. No.: WO97/29529

PCT Pub. Date: Aug. 14, 1997

(30) Foreign Application Priority Data

Feb. 7, 1996 (DE) ............................................ 196 04 425
May 3, 1996 (DE) ............................................ 196 17 711

(51) Int. Cl.⁷ ................................................. H01S 3/13
(52) U.S. Cl. ........................................ 372/29.02; 372/70
(58) Field of Search ............................. 372/70, 29.02; 385/100, 134, 147; 359/341

(56) References Cited

U.S. PATENT DOCUMENTS

| | | | | |
|---|---|---|---|---|
| 3,679,907 A | * | 7/1972 | Bonner | 307/88.3 |
| 4,161,944 A | * | 7/1979 | Muckerheide | 128/654 |
| 4,764,933 A | * | 8/1988 | Kozlovsky | 372/40 |
| 5,081,637 A | * | 1/1992 | Fan | 372/72 |
| 5,321,711 A | * | 6/1994 | Rapoport | 372/41 |
| 5,485,482 A | | 1/1996 | Selker et al. | |
| 5,521,932 A | * | 5/1996 | Marshall | 373/36 |
| 5,590,147 A | * | 12/1996 | Hobbs | 372/75 |
| 5,773,345 A | * | 6/1998 | Ota | 438/286 |
| 5,867,305 A | * | 2/1999 | Waarts | 359/341 |

FOREIGN PATENT DOCUMENTS

| | | |
|---|---|---|
| DE | 4402668 | 8/1995 |
| GB | 2215906 | 9/1989 |

* cited by examiner

Primary Examiner—James W. Davie
Assistant Examiner—Gioacchino Inzirillo
(74) Attorney, Agent, or Firm—Milde, Hoffberg & Macklin, LLP

(57) ABSTRACT

Optically pumped amplifiers, in particular solid-state amplifiers, comprise an amplification medium (1) and an optical pumping arrangement (5) via which the pumping radiation is coupled to the amplification medium (1), the pumping radiation being formed before coupling. The volume of the amplification medium is only partially pumped; the pumped volume of the amplification medium is approximately rectangular in cross-section and approximately perpendicular to the optical axis; and the ratio of the width to height of the rectangular cross-section is greater than 1:8.

37 Claims, 12 Drawing Sheets

US 6,351,477 B1

OPTICALLY PUMPED INTENSIFYING AGENT, IN PARTICULAR A SOLID INTENSIFYING AGENT

BACKGROUND OF THE INVENTION

The present invention relates to an optically pumped amplifier, especially a solid-state amplifier, with an amplifying medium and with an optical pumping array, by means of which the pumping radiation is coupled to the amplifying medium; whereby the pumping radiation is formed before the coupling; and whereby the volume of the amplification medium is only partially pumped.

Optically pumped amplifiers in the form of laser arrays have made their entry into almost all areas of technology. Current developments in the area of laser arrays are directed, among other things, toward increasing the output, improving beam quality, and forming and transforming the output radiation in a defined way.

One class of lasers which, in recent years, has found increased applications in materials processing and medicine is solid state lasers. They are distinguished in that with them, particularly in low power classes, high beam quality can be produced. Such solid state lasers are further distinguished by small attainable design sizes, typically with a length of about 8 cm and a diameter of 1 cm.

While solid state lasers have been pumped in the past using lamps, increasingly the solid state medium is pumped by means of diodes or diode fields. As opposed to lamp-pumped solid state lasers, diode-pumped solid state lasers are distinguished, among other things, by high efficiency, high beam quality, long service life and small dimensions. These can be attained especially with a diode pump array. Various types of laser systems can be implemented in connection with diode-pumped laser arrays. In solid state lasers, distinctions are principally made between axially and transversally pumped solid state lasers (for example, solid state lasers pumped using diodes). Generally the axial pumping array for lasers is used with an output up to several tens of watts, while the transverse pumping array is preferred for scaling the output up to several kilowatts.

The limiting factor for beam quality and output performance of optically pumped amplifiers, which also holds true for diode-pumped solid state lasers, is thermal interference. This is caused by unavoidable heat losses in the amplification medium and in the lasing medium. Additionally, the adjustment between the pumped volume and the mode volume of the resonator plays a decisive role in efficiency and beam quality. To comply with these requirements, the amplification medium—in solid state lasers, it is the solid state medium—is pumped via the end ("end-on"), making possible an optimal overlap of active volume and mode volume. If diode lasers or diode laser arrays or field arrays are used for such pumping, the radiation of diode lasers, being asymmetric by nature, is so formed that it can be focused on a circular spot. The homogenized radiation is then coupled through the end into the solid state medium, as is also depicted in FIG. 19 from the drawings. If the resonator is designed so that the mode diameter roughly corresponds to the pumping spot diameter, then the laser can be operated efficiently with a high beam quality.

One problem that exists with end-on pumping is that relatively expensive beam formation is needed to focus the pump radiation, and that the limited pump volume limits the attainable laser performance.

To scale the laser output to higher performances, laterally and transversely pumped arrays are used. One such array is depicted in FIG. 20. One such coupling of pump radiation is designated as closed coupling in the technical terminology. It is distinguished by its simple design. It is true that attainable laser performance per length, particularly for pulsed lasers, is limited, since only limited pumping performance can be made available with this array. For this array, high fabrication precision in relation to the relative position of diode laser billets to the rods to be pumped is required. Otherwise, a large part of the diode radiation cannot be coupled into the amplification medium owing to the large divergence angle.

Additional arrays for pumping of solid state bodies according to the state of the art are depicted in FIGS. 20 to 22. In accordance with these arrays, the highly divergent diode laser beams are coupled using cylindrical lenses or elliptical cylinder mirrors into the solid state medium. In these arrays, the gain and amplification distribution can be optimized, depending on the application, through varied focusing. However, focusing components are required, which considerably increase the fabrication costs of the arrays.

The previously mentioned pumping arrays are used for amplification media, i.e. as regards solid state lasers, the solid state media, in the form of rod geometries. It is true that similar pumping arrays can also be used for amplification media or solid state media with so-called slab geometries or plate geometries. Two examples of arrays which preferably can be used in connection with plate-shaped amplification media, are depicted schematically in FIGS. 23 and 24 of the drawings. In the pumping array depicted in FIG. 23, the radiation of the diode laser stack is coupled to the amplification medium by means of a so-called non-imaging concentrator. It is in fact difficult with such an arrangement to illuminate the amplification medium uniformly, i.e., homogeneously, from all sides. Optimization regarding this is attained with the array of FIG. 24, with the diode laser beam coupled through the two narrow sides into the plate-shaped amplification or solid-state medium. Here also it is in fact difficult to achieve a homogeneous optical stimulation or irradiation of the plate-shaped solid-state medium, and thus a homogeneous pumping distribution within the solid state medium.

One feature common to the previously described arrays is that the amplification medium (solid state medium) is pumped in full-volume fashion by means of the pump radiation (diode laser radiation). Owing to this, an amplification profile is produced that is clearly defined by the dimensioning of the amplification medium in all directions. Fundamentally, however, it is not possible that such a clearly delimited amplification profile is fully covered through the laser mode. This, however, is a prerequisite for efficient laser operation and high beam quality of effective radiation. Additionally, the measurements of a solid state medium that is pumped with diode laser radiation cannot be kept arbitrarily small. This is because of the particular absorption coefficient of diode laser radiation. To operate the laser with a high beam quality, therefore, the laser mode volume must be selected to be appropriately large. This, in turn, results in a resonator length which is technically difficult to master. Not lastly, the attainable output performance is limited by thermal disturbances, such as birefringence and thermal lenses.

SUMMARY OF THE INVENTION

Proceeding from the state of the art described above, and the problems connected therewith, the task of the present invention is to provide an optical amplifier in which it is possible to attain an optimal overlap of the pumped volume through the mode volume while simultaneously minimizing the thermal degradation, thermal aberration and depolarization loss.

In regard to optically pumped amplifiers, especially in regard to solid state amplifiers of the types previously described, this problem is solved by having the volume of the amplification medium only partially pumped. The pumped volume of the amplification medium in cross section exhibits an approximately rectangular cross section perpendicular to the optical axis. By means of these measures, through suitable coupling arrangements, efforts are made to have only defined partial volumes of the amplification medium (such as a solid state medium) by means of pumping radiation, preferably in connection with solid state amplifiers by means of diode laser beams, with an approximately rectangular cross section. A defined rectangular cross section of the amplification medium can be pumped, and in fact independently of its actual cross sectional form. The latter could also be of circular shape, for example. What is attained by this is that an optimal overlap in regard to the beam quality efficiency is possible, particularly in connection with an off-axis, unstable resonator. There is a quasi-one-dimensional heat transfer, and thus, minimal depolarization loss.

By the term "amplification medium", the description, what is to be understood is a medium that contains excitable atoms, molecules, ions or excimers, by means of pumping radiation. The term amplification medium is also used in the description when only partial pumping or excitation takes place.

Because of the small dimension in relation to the amount of the pumped volume, a small thermal lens effect is achieved by the specific measures according to the invention.

Additionally, only extremely low depolarization losses occur, since in this case there is a quasi-one-dimensional heat transfer. By means of the defined, rectangular volume excitation with pumping radiation, an effect on the beam quality can be attained. This is done by having the height of the pumped volume cross section designed so that it approaches the dimension of the ground mode (ground mode diameter), resulting in a higher attainable efficiency. These advantages are to be particularly cited in relation to solid bodies which are used as amplification media. Additionally, they are to be cited precisely when such solid state media are pumped with diode radiation, for it is precisely with solid state media that the invention-specific measures can implement such pumping geometries relatively simply and efficiently.

What is preferred is an adjustment of the ratio of the maximum to the minimum cross sectional width of the amplification medium pumped volume, viewed as perpendicular to the optical axis of the amplification medium. This adjustment is done so that it amounts to less than 1:5. This means that the fluctuation width of the optically pumped zone in the amplification medium, by such means as by one or more constrictions, is kept within defined small limits.

Additionally, the relationship of width to height of the rectangular cross section of the pumped volume must be greater than 1.8, so that an elongated cross sectional volume is pumped in the amplification medium. In contrast to a rectangular-cross-section pumped volume, by this means an advantage is achieved in that a quasi-one-dimensional heat transfer is present. Connected with that is minimal depolarization loss.

Approximation of the pumped volume to a rectangular cross section can be simplified by having the amplification medium pumped from two opposite sides, and approximately perpendicular to the optical axis. This is called transverse pumping. A further optimization to excite an approximately rectangular cross sectional volume by means of optical pumping radiation can be attained if the amplification medium is pumped from two opposite sides that are roughly parallel to the optical axis. This is called axial pumping. By this means, an approximately ideal rectangularly pumped volume can be achieved.

As was already mentioned previously, the invention-specific measures in particular offer advantages in connection with amplifiers in which the amplification medium is a solid state medium. In connection with such solid state media, this can be divided into various zones which are subjected to different doping. These zones can be formed either along the optical axis, or in fact perpendicular to it. With varying doping in the direction of the optical axis, the pumping performance density can be controlled with axial pumping. With doping that is altered in a direction perpendicular to the optical axis, the gain profile can be adjusted to the requirements. Preferably, the doping decreases from zone to zone toward the pumping source. By this means, homogeneous pumping along the pumping direction can be attained.

In connection with a solid-state medium as an amplification medium, optical pumping is done preferably by layers. For this purpose, the amplification medium is divided into fictitious, layered sections, preferably parallel to the optical axis, which are then pumped with varied pumping radiation. By this means, the pumping performance is increased, and thus also the laser performance.

If the solid state medium, for example in relation to a layering, as is presently indicated, is divided, it can be useful to insert a cooling device between each two solid state media, in order to remove heat, thus further increasing attainable performance per length.

As a pumping source of the pumping array by which the amplification medium is optically pumped, it is preferable to use diode lasers or diode laser arrays. These diodes or diode laser arrays can be designed to be compact and stacked in a great variety of configurations. Thus the volume of the amplification medium can be pumped in defined fashion, particularly in reference to the previously indicated, preferred embodiment forms, in which the volume of the amplification medium is divided into zones. Diode lasers and diode laser billets exhibit an elliptical beam cross section that greatly expands or diverges. For this reason, preferably the pumping radiation of a diode laser billet which is used for pumping, is collected by means of a cylindrical lens in linear fashion and/or focused, and coupled in defined fashion to the amplification medium with a narrowly limited pumping radiation cross section. The goal is to have pumping radiation which is high-power and can be emitted by a multiplicity of diode lasers, within a very narrowly defined volume of the amplification medium. To achieve this, several diode laser billets, which emit a quasi-linear-shaped output field, are combined into a field array. The output field of each individual diode laser billet is combined via a cylindrical lens assigned to this billet. The individual collimated radiation fields are then brought to an additional, focused cylindrical lens, from which the entire output field is coupled to the amplification medium.

As an alternative, initially the pumping radiation can be coupled into one or more optical waveguides by a suitable optical array. The pumping radiation emitted from the optical waveguides can then be coupled through an additional optical array into a section of the amplification medium.

To do optical pumping using diode laser billets of extended amplification media, several diode laser billets are placed next to each other, in the direction of the optical axis. Such a division has the advantage of permitting the laser power to be scaled practically at will.

Diode lasers of other beam sources, such as solid state lasers, excimer lasers, and/or ion lasers, can be used for optical pumping as pumping sources for the pumping array.

To fabricate a laser with the invention-specific amplifier, the amplification medium is placed within a resonator. Particular advantages can be achieved in relation to such a laser array if the resonator is designed so that in the width of the pumped volume an off-axis, an unstable resonator is formed, and in the height of the pumped volume a stable resonator is formed. It is exactly in connection with this resonator design that there are advantages in the invention-specific measures. High beam quality (also diffraction-limited beam quality) can be attained at high efficiency.

For stable resonators, the beam quality over the cross section(s) of the radiation emitted from the resonator can exhibit a certain inhomogeneity in both directions. Therefore, the radiation emitted from the resonator can be homogenized by an optical array. Such an optical array can be designed using such concepts as two step-like mirrors.

If necessary, the radiation emitted from the amplification medium can be converted by means of an etalon-shaped, non-linear medium. In connection with a laser array, the etalon-shaped medium or component can be placed inside or outside the resonator.

Yet another embodiment form, in connection with which the invention-specific pumping array can be used, is that in which the solid state medium is in the form of an optical waveguide. In one advantageous embodiment, this guide can have a doped core, preferably with a rectangular cross section. In this arrangement, the doping can differ between core and cover. It is precisely because of this that an extremely compact and disturbance-free laser call be produced.

Preferably in such an array, the pumping radiation is coupled to at least a front-side end of the cover and the core, and be brought within the cover. Typically such an optical waveguide can be 1 m long and have a diameter in the range from 5 $\mu$m up to about a millimeter. As was indicated previously, with such an optical waveguide, a laser resonator can be fabricated, by having the resonator mirror placed on the two front surfaces of the optical waveguide. Such a laser is distinguished in that the large surface ensures effective removal of energy-loss heat.

Additionally, an optical waveguide has the advantage that it is via the large surface of an appropriately long optical waveguide that the energy-loss heat can be directed outward via the cover surface. For this purpose, two options are available. One is to mount the optical waveguide on a cooling plate and be in thermal contact with the cooling plate. The other possibility is to place the optical waveguide in a cooling chamber. Such a cooling chamber can be formed by having a hose around the optical waveguide, so that free space remains between the optical waveguide and hose. Through this space, a circulating fluid such as a coolant can be made to flow. The cooling cover and/or the coolant can assume a waveguide function for the pumping radiation.

There are instances when a long pump length must be attained in the pumping beam direction, particularly for the case of axial pumping. In such instances, the amplification medium should be pumped with radiation whose wavelength corresponds at least to a part of the weak absorption lines of the medium. In connection with a solid state medium doped with neodymium, it is pumped with pumping radiation whose wavelength is about 870 nm. This combination results in a highly efficient, long pumping extent in the direction of the optical resonator. By this means, possible parasitic oscillations can be suppressed.

Additional particulars and features of the invention can be gleaned from the following description of specific embodiment examples, using the drawings.

DESCRIPTION OF THE PREFERRED EMBODIMENTS

First, some known arrays will be described briefly referring to FIGS. 21 to 24. These figures have already been mentioned in the introduction portion of this text.

Figure 19:
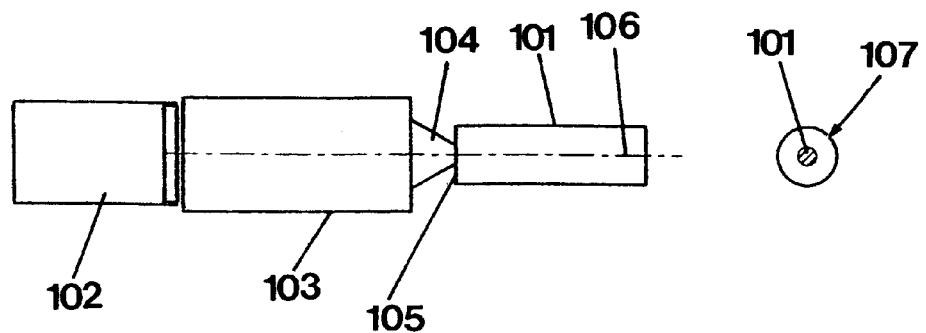
FIGS. 19 to 24: various arrangements which show conventional arrays of various amplification arrays which are optically pumped.

FIG. 19 shows an array in which a solid state medium 101 is pumped by means of diode laser 102, whereby the diode laser beam 104 is coupled via a beam formation and focusing device 103 into the front-side end 105 in a roughly circular-shaped spot, focused into the solid body 101. In the FIG. 19 array, the axis of the cylindrical-shaped solid body 101 is depicted as a dash-and-dot line, and designated as 106. With such an array, in the solid state medium 101, a stimulated, active volume is reached, as is depicted with shading in the right cross sectional depiction of FIG. 19 and designed by 107.

Figure 20:
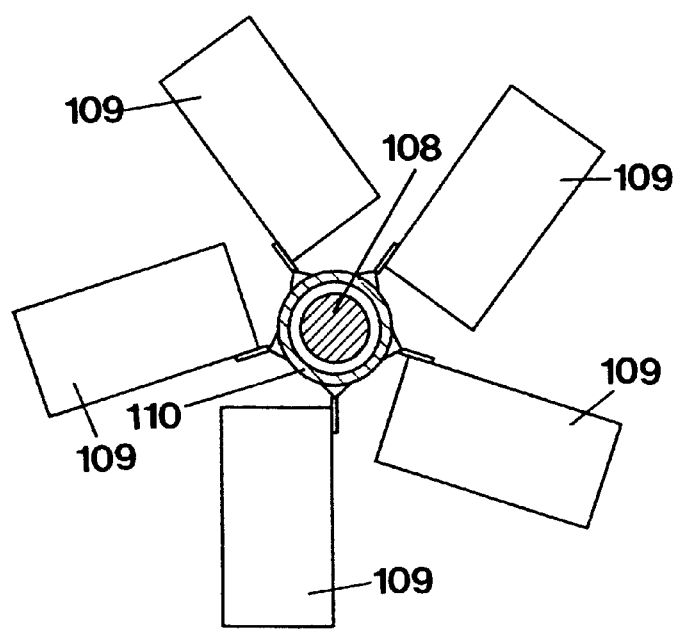
Figure 21:
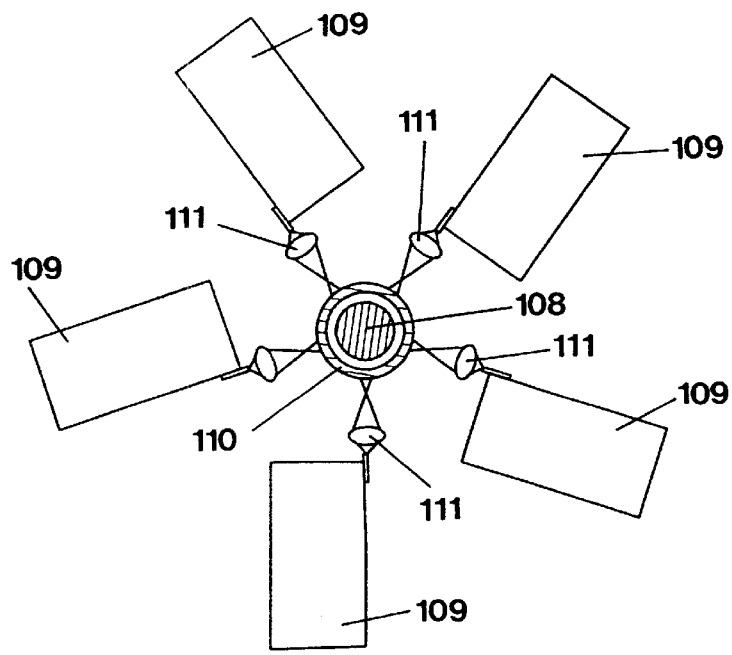

FIG. 19 depicts an array in which pumping is done "end-on." In contrast, FIG. 20 is a schematic drawing of an array in which the pumping radiation is coupled from several diode laser arrays 109 which are distributed around the periphery of solid state medium 108. Solid state medium 108 is additionally surrounded by a cover pipe 110 that is transparent for laser radiation at a distance, so that an additional annular space is formed for removal of the energy-loss heat produced.

Figure 22:
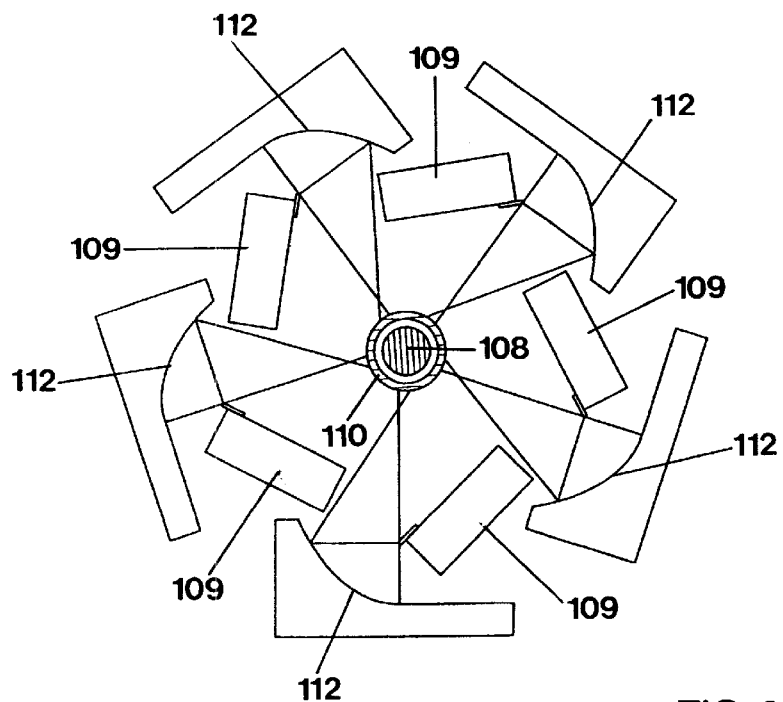

The aim is to couple more pumping power into the solid state medium 108 than in the array as it is depicted in FIG. 20. To achieve this, the highly divergent laser output is coupled by means of cylindrical lenses 111 (FIG. 21) or elliptical cylindrical mirrors 112 (FIG. 22). The amplification distribution in the solid state medium 108 can be adjusted and optimized by the varied focusing.

Figure 23:
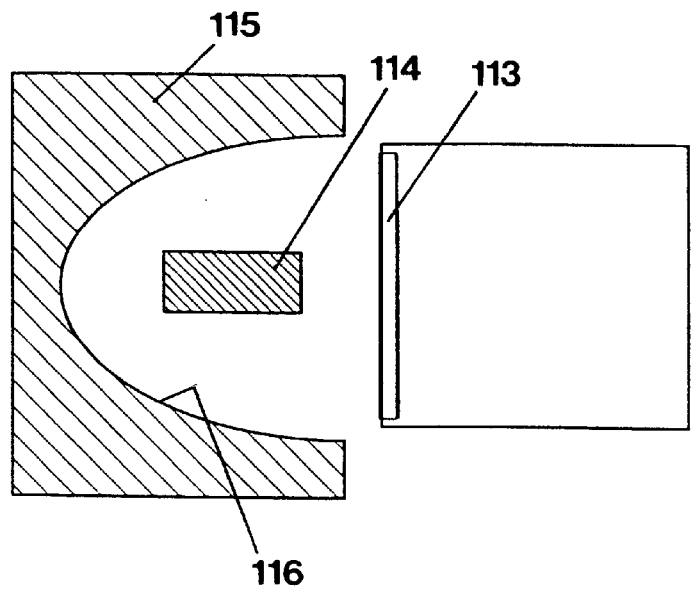
Figure 24:
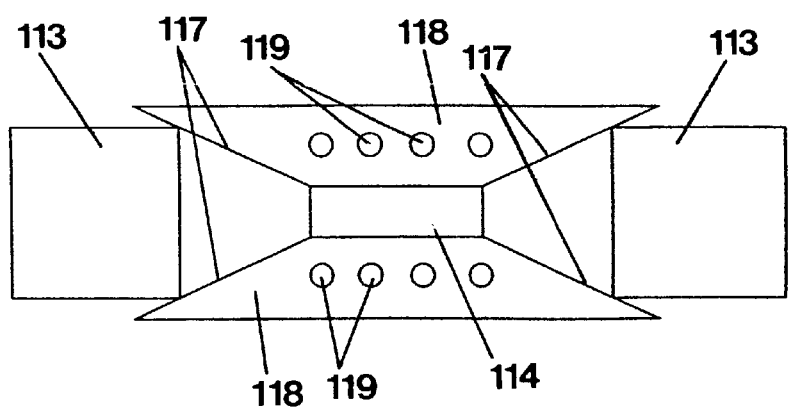

FIGS. 23 and 24 depict two different arrays for coupling pumping radiation which is emitted by diode laser field arrays 113, to a plate-shaped solid state medium 114. In the FIG. 23 embodiment form, the diode laser output is emitted to a side surface of the solid state medium 114 directly facing the diodes, while radiation to the other surfaces of the solid state medium 114 is done via a concentrator 115 which is not shown, which has a parabolic reflection surface 116. The FIG. 23 array does not produce homogeneous illumination of the solid state medium 114 by pumping radiation.

According to the FIG. 24 configuration, the output of a diode laser field array 113 is irradiated onto each of the two narrow sides of solid body medium 114 by means of a concentrator 117 which is not shown, with corresponding reflection surfaces. Meanwhile, energy-loss heat is removed via the longitudinal sides via cooling body 118, which, if necessary, is cut through by cooling channels 119. It is true that, using this array, only in a limited sense can a homogeneous pumping distribution be achieved within the solid state medium 114.

Figure 1:
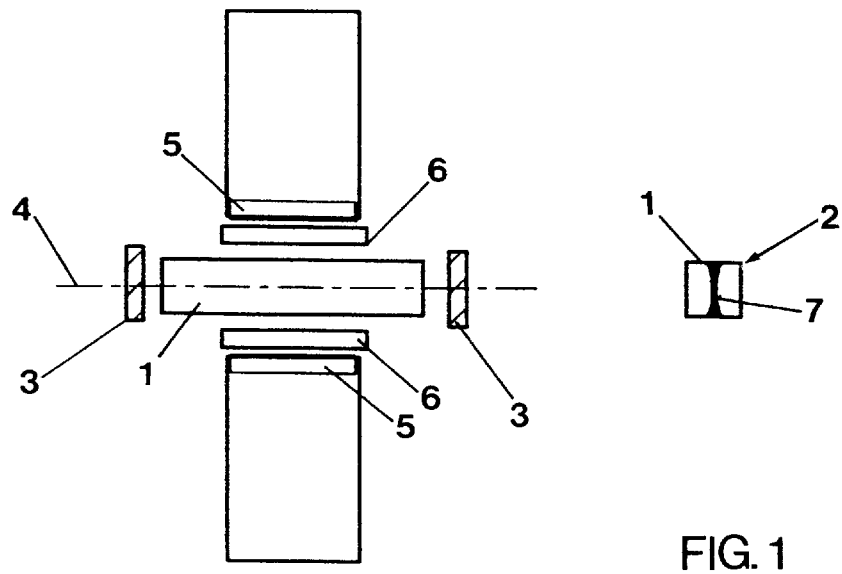
FIG. 1: a first embodiment form of the invention, which shows a laser array which is pumped with diode lasers.

According to the invention, a solid state medium is only partially pumped by having the pumped volume of the medium in cross section have an approximately rectangular cross section, perpendicular to the optical axis. A schematic arrangement to implement this principle is shown in FIG. 1 in the form of a solid state laser. A solid state medium, such as a neodymium-YAG crystal, which has a rectangular or square cross section 2, as shown by the right cross section depiction in FIG. 1, is placed between two resonator mirrors 3. On each of two opposite sides of the solid state medium 1 and perpendicular to the resonator axis 4, a diode laser billet 5 is placed. The divergent radiation of this billet is in each instance assigned via a cylindrical lens 6, perpendicular to the resonator axis 4, into the solid state medium 1. Collimation and focusing of the diode laser radiation is done in such a way that only a part of the cross section 2 is illuminated, so that a strip-shaped amplification cross section is obtained. Thus, there is a one-dimensional heat transfer and thus a slight depolarization loss.

The strip-shaped amplification cross section profile 7 should preferably have a relationship of its width to height greater than 1.8. Additionally, the width variation of the amplification cross section profile 7, i.e., the relationship of the maximum to the minimum cross-sectional width of the pumped volume of solid state medium 1, should be less than 1.5. This can be attained by such measures as the focusing optics, in that the double Rayleigh length of the focusing pump radiation approximately matches the dimension of the amplification medium in the pumping radiation direction.

Figure 2:
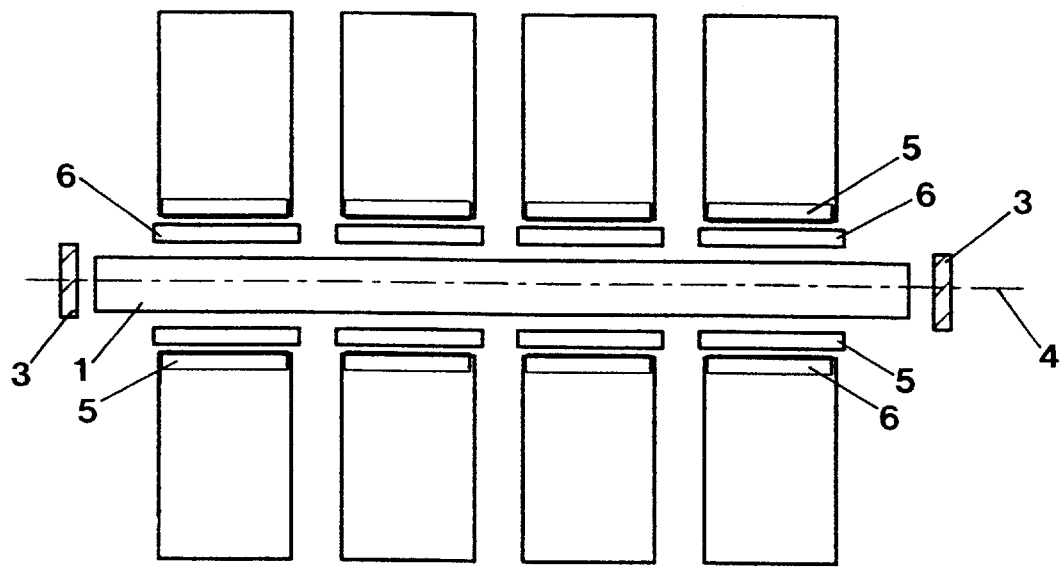
FIG. 2: an array corresponding to FIG. 1, in which a multiplicity of diode laser arrays are placed in distributed fashion along the optical axis of the amplification medium, for output scaling.

To scale the FIG. 1 array up to higher performances, in connection with an appropriately long solid state medium 1, several diode laser billets 5, each of which has a cylindrical lens 6 assigned, are distributed along the resonator axis 4 on opposite sides, as is shown in FIG. 2. On each side, four such diode laser billets 5 are provided. As can be seen by FIG. 2, such a modular design can result in a scaling up to higher performance.

Figure 3:
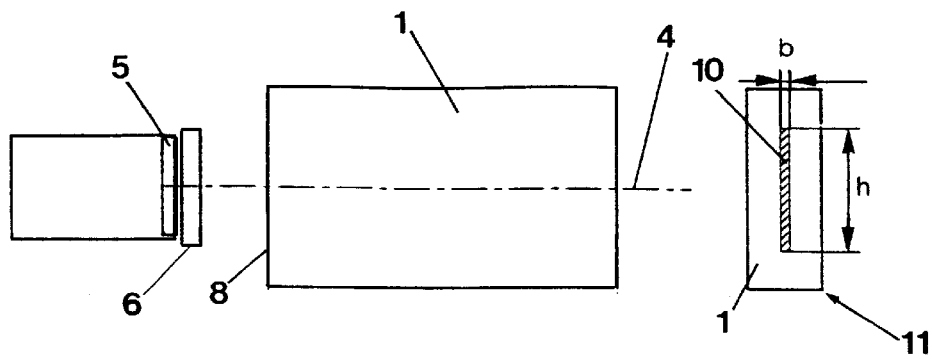
FIG. 3: a schematic depiction of a solid state medium in which the pumping radiation emitted via a diode laser array is collimated by means of a cylindrical lens.
Figure 4:
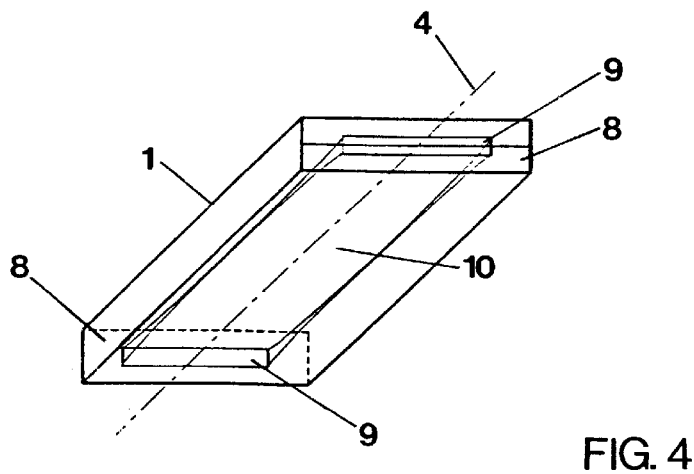
FIG. 4: in a perspective view, the solid state medium, as is shown in FIG. 3, in which the pumped volume is shown in its spatial extent.
Figure 5:
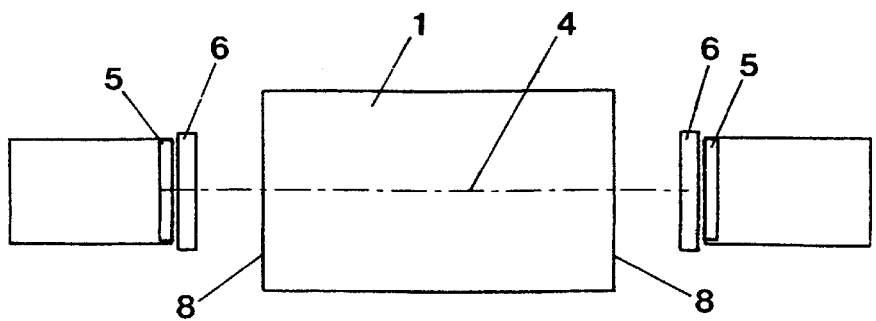
FIG. 5: an arrangement corresponding to FIG. 3, in which in fact the solid state medium is pumped via two ends, seen in the direction of the optical axis, by diode lasers.

In the arrays as per FIGS. 1 and 2, the pumping radiation is coupled perpendicular to the axis 4 of solid state medium 1. In contrast, in FIGS. 3 to 5, schematic arrays are depicted, according to which the pumping radiation, again emitted by diode laser billets 5, is coupled via a corresponding cylindrical lens 6 assigned to the diode laser billet 5, parallel to the resonator axis 4. In FIG. 3, a coupling is effected via the left-side front side 8 of the solid-body medium 1. FIG. 5 shows an array in which, for performance scaling, coupling of the pumping radiation via both front surfaces 8 of the solid state medium, takes place parallel to the resonator axis 4. The solid state medium 1 is only partially illuminated by pumping radiation, in that radiation impinges over only a partial, strip-shaped area 9 of front surface 8, as can be seen in FIG. 4. As can further be gleaned from FIG. 4, a pumping volume 10 is produced, which has a shape similar to a plate. The constriction effect in the middle of the pumping volume in FIG. 4 is depicted as exaggerated, i.e., not to scale. In contrast, the right cross section depiction 11 of solid state medium 1 of FIG. 3 shows the idealized, stimulated amplification cross section volume 10, in this embodiment form with a width w, which corresponds to about 10 times the height h, so that the ratio of width to height of the rectangular cross section of the pumped volume results at about 10. The side surfaces through which no pumping radiation is coupled, and/or through which no laser output is emitted, can be unpolished and/or absorbing.

Figure 6:
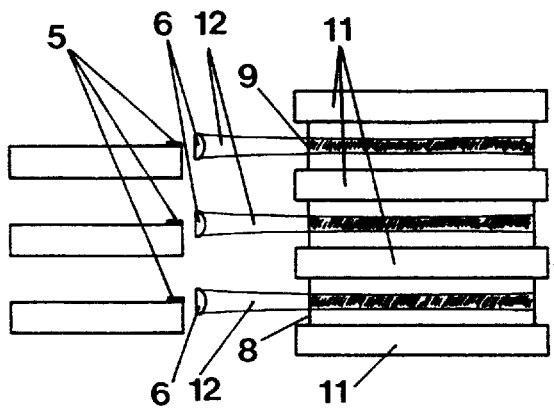
FIGS. 6 and 7: two arrangements in which several arrays, as depicted, for example, in FIG. 3, are combined and stacked.
Figure 7:
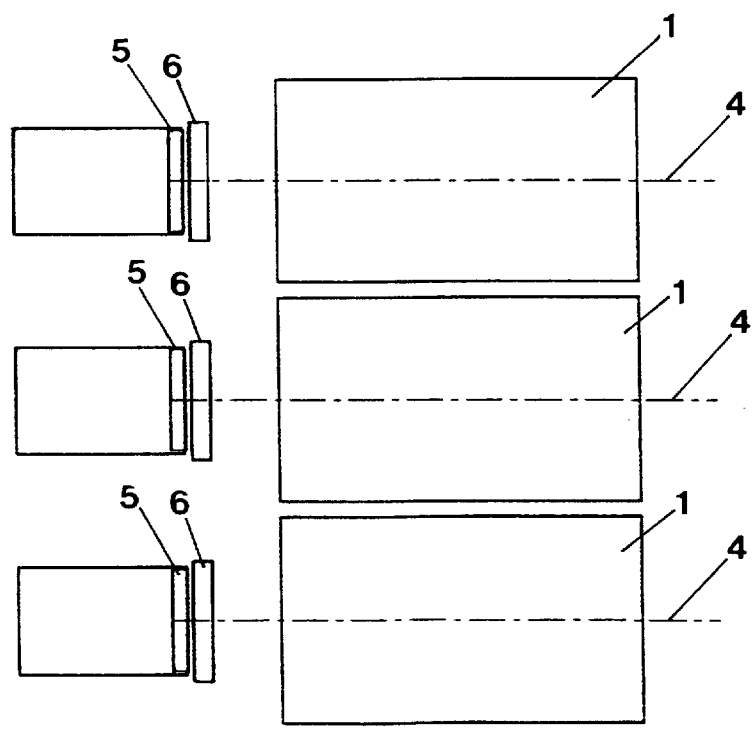

To achieve a further increase in laser power with the invention-specific principle, arrays can be designed such as are depicted in FIGS. 6 and 7. In FIG. 6, several solid state media 1, each corresponding as examples to FIGS. 1 and 3, are stacked atop each other while fitting a cooling unit 11 in between, with an additional cooling unit 11 on the outer side of the uppermost and lowermost solid body 1. To each solid state medium 1, a diode laser billet 5 is assigned. The radiation 12 of each billet is partially beamed via a cylindrical lens 6 into the assigned solid state medium 1. The irradiation cross section surface 9 in relation to its height amounts to about a third of the height of the front surface 8 of the solid state medium. As per the FIG. 3 and 4 depictions, a plate-shaped pumping volume 10 is generated in each of the solid bodies 1. Though this is not shown in FIG. 6, the pumped radiation from the solid bodies can be coupled via appropriate emission windows 9, or the side surfaces, and collected by means of a suitable optical array, such as of bevel-edged mirrors, into a beam.

The FIG. 7 array shows three pumping arrays, each with a solid state medium 1, which are arrayed with their axes 4 running parallel to each other. In such an instance also, for scaling to high power levels, the decoupled, amplified radiation components can be combined by means of suitable devices such as stepped mirrors.

Figure 8:
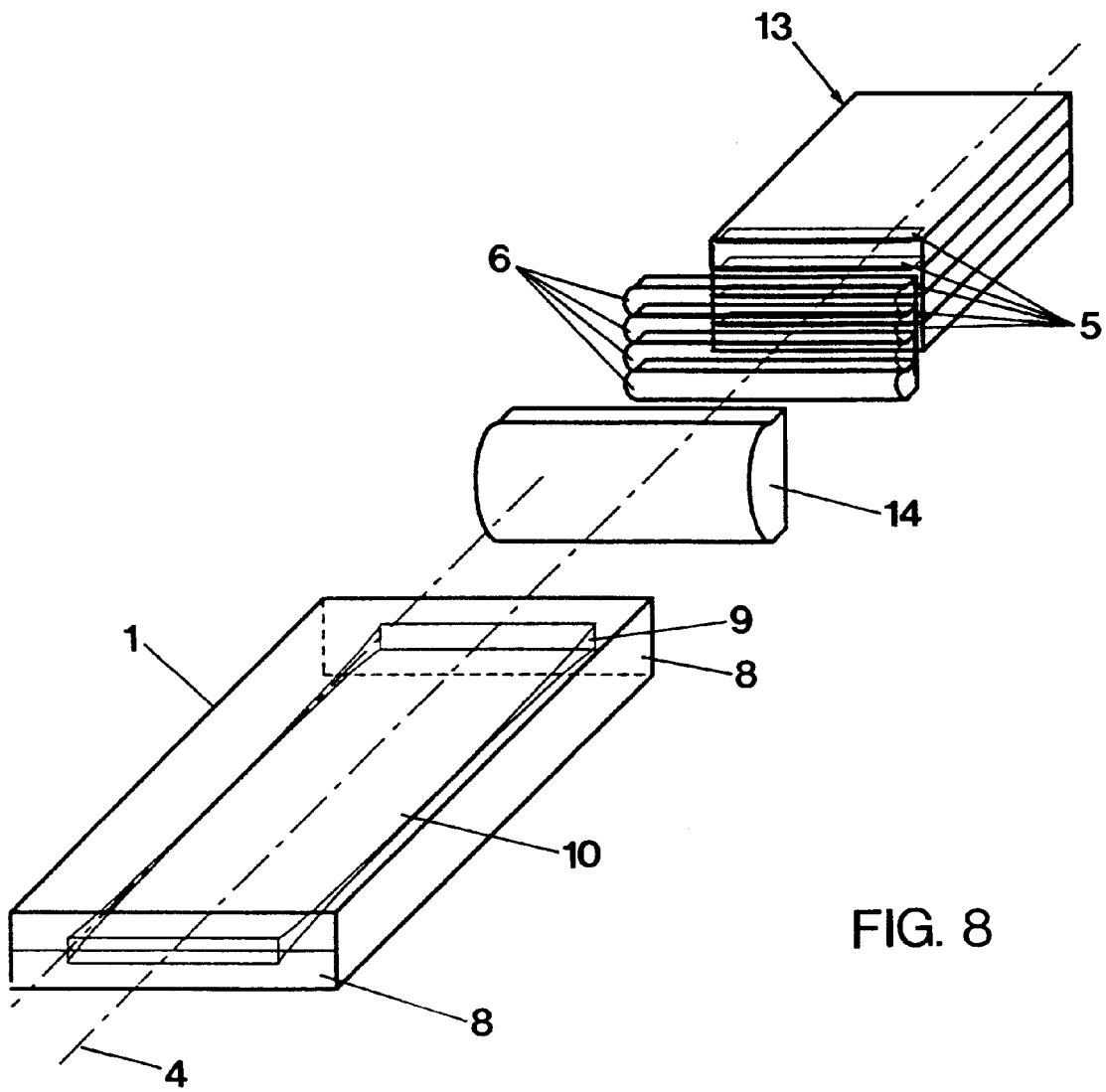
FIG. 8: a perspective, schematic depiction which shows an embodiment form for collimating and coupling of diode laser radiation which is generated by several laser diode billets stacked one on top of the other in a solid state medium.

As was already mentioned initially, a fundamental problem of scaling solid state amplifiers pumped by diode lasers to higher performances lies in coupling sufficient diode laser radiation into the solid body. In this regard, the limits are set especially by the diode lasers themselves, which normally require a relatively large cooling body. Correspondingly, a large amount of space is required around the solid body that must be pumped, as can be seen from FIGS. 21 to 24. To solve this problem, an array is designed which is schematically depicted in FIG. 8. In its fundamental design it matches the embodiment form of FIGS. 1 to 5. Several diode laser billets 5 are stacked directly atop each other, so that a diode laser field array or a diode laser array 13 is produced. In FIG. 8, four such diode laser billets 5 are stacked atop each other. A cylindrical lens 6 is assigned to each diode laser billet 5. The lens 6 is positioned close to the emission windows of the diode lasers, to collimate the strongly diverging diode laser outputs in the conformal direction. The pre-collimated radiation is then fed to an additional cylindrical lens 14, which then couples the entirety of the radiation emitted by the diode laser array 13 to the front side 8 of solid state medium 1, or the side surface, in the area of a narrow, strip-shaped irradiation surface 9. The diode laser array 13 with the beam-formation and guiding optics in the form of cylindrical lenses 6 and additional cylindrical lens 14, as the FIG. 5 schematic depiction shows, can be additionally assigned, to the lower front surface 8 in FIG. 8, so that with such an array, the solid state medium 1 can be pumped via both front sides 8. Instead of a direct pumping, the pumping radiation can first be coupled into an optical waveguide. In combination with an optical array, the optical waveguide guides the radiation to the amplification medium. Light guides can be provided instead of the cylindrical lenses 6 as well as the additional cylindrical lenses 14. These guides feed the diode laser outputs which are emitted by the diode laser array 13, directly to the irradiation surface 9 and are coupled to it.

The previously-mentioned pumping arrays and resonator configurations can be applied to other optically pumped amplifiers and lasers, such as T-sapphire lasers pumped with frequency-doubled YAG lasers. Instead of a solid state medium, the amplification medium can also be a gaseous or liquid medium.

The pumped plate- or slab-shaped volume is also defined by its measurements (height×width×length). A relationship of width to height >1.8 is preferable. The typical measurements lie in a range from a 1 mm×10 mm×20 mm, (height× width×length). With such an end-on-pumped active medium, an output power of some hundreds of watts can be achieved. Because of the partial excitation, which is rectangular in cross section, of the volume of the amplification medium, a one-dimensionial heat transfer in the active medium is guaranteed, which corresponds to minimal depolarization loss.

Figure 9:
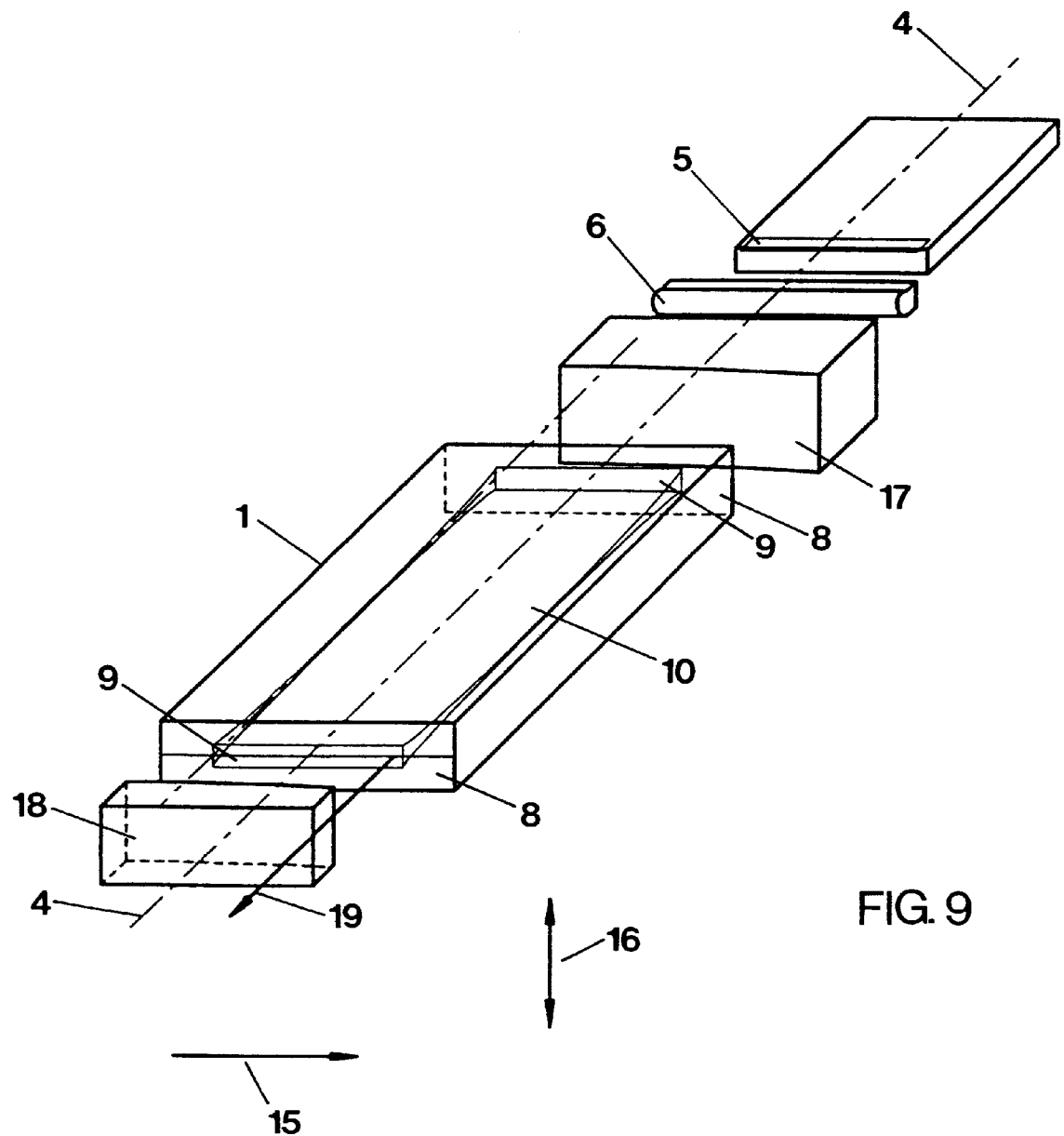
FIG. 9: a schematic of a so-called hybrid resonator according to a further embodiment form of the invention.

FIG. 9 depicts one preferred design of a resonator configuration. In connection with it, an optically pumped, active medium is used, as is explained using FIGS. 3 and 4. This resonator configuration can be designated as a hybrid resonator. With it, the resonator optics are designed so that in the width direction, as indicated by arrow 15, an unstable off-axis resonator is formed. In the narrow direction, indicated by the double arrow 16 in FIG. 9, a stable resonator with gain guiding is formed. In other words, the mode selection is done at least partially by dimensioning the amplification and the gain.

In a stable resonator (not depicted), the output or working beam may possibly exhibit differing beam qualities in the two directions. For many applications, such as for fiber coupling, this is disadvantageous. To circumvent this problem, the beam quality must be homogenized in both directions, and the beam focused on a roughly round surface.

This can be achieved by such measures as by a step-like mirror.

The pumping radiation is in turn made available by a diode laser billet 5, which is collimated by a cylindrical lens 6 and irradiated into the solid body 1, positioned within two resonator mirrors 18. For this purpose, the resonator mirror 17 is configured to be transparent to pumping radiation. Radiation coupling takes place parallel to the resonator axis 4. The resonator mirror 18 has a decoupling window, via which a working beam 19, offset from the axis 4, is decoupled. The beam quality attainable with such a laser array is diffraction-limited. Additionally, an optimal overlap of pumped volume and laser volume can be realized, which means a maximum efficiency.

Figure 10:
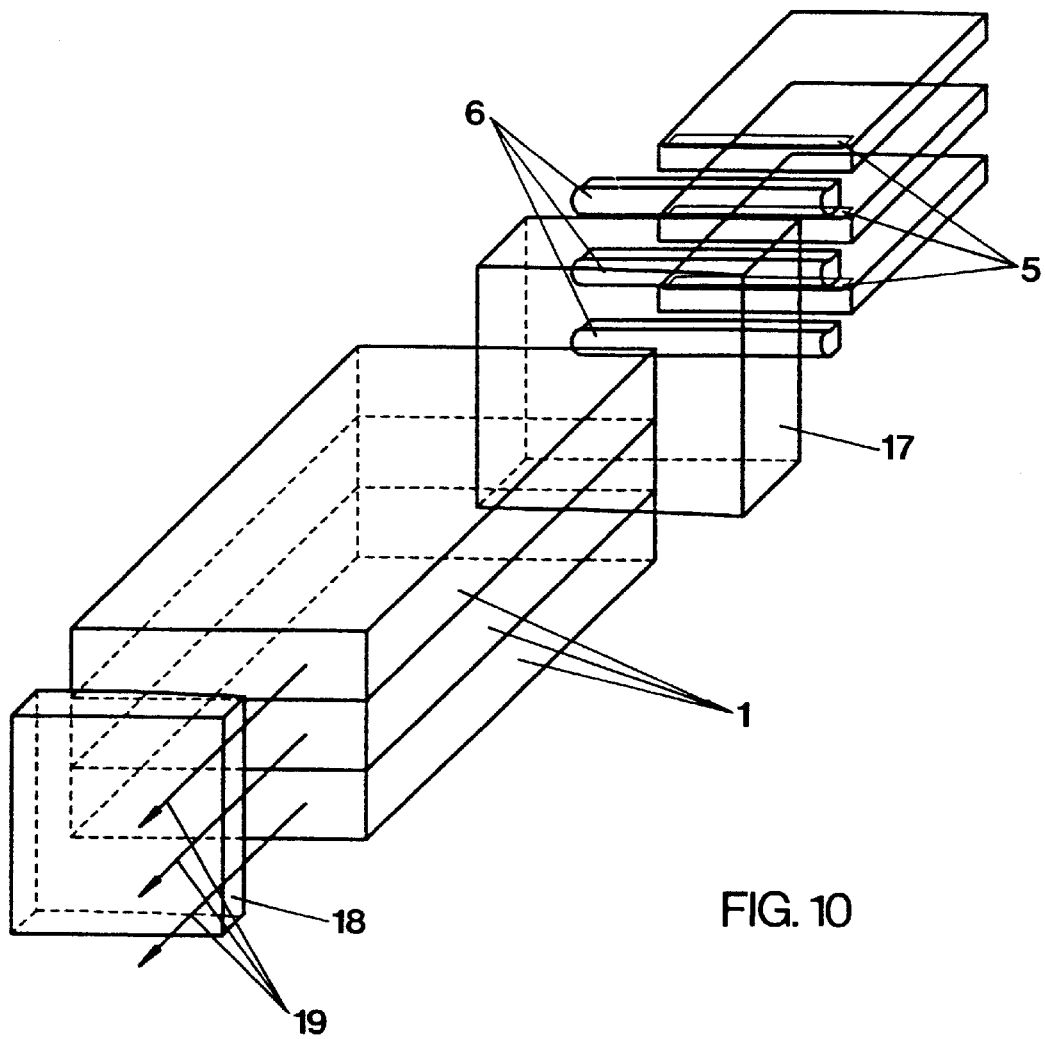
FIG. 10: schematic of yet another hybrid resonator, especially for an array in connection with FIG. 6.
Figure 11:
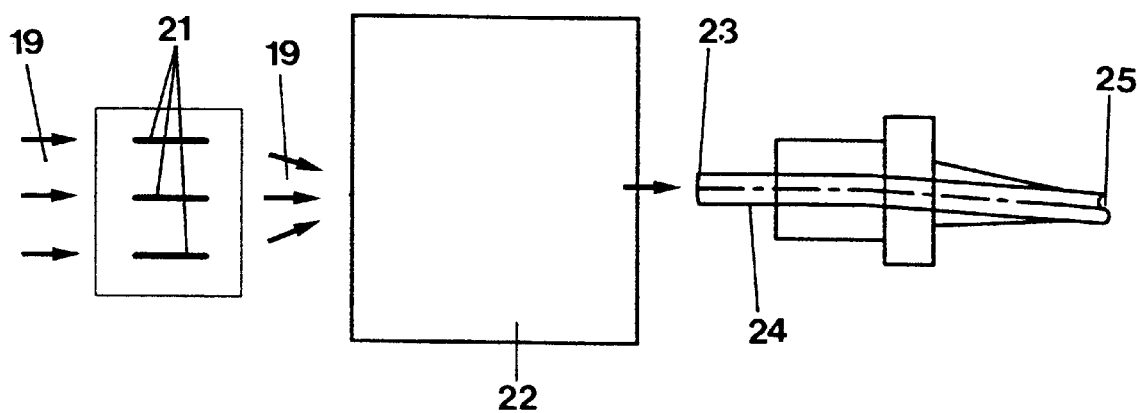
FIG. 11: an arrangement for coupling the beam cross section to an optical fiber. As an example: a cross section generated by the FIG. 1 array.

The arrangements of FIGS. 10 and 11 serve exclusively for performance scaling with a minimum number of resonator mirrors.

Figure 12:
FIG. 12: a schematic of the cross section of a monolithic, plate-shaped solid state medium.
Figure 13:
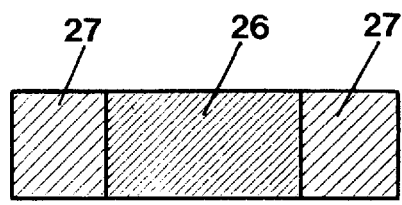
FIG. 13: as compared with FIG. 12, a sandwich-type design of the solid state medium with variously doped zones.

In the previous embodiment forms, solid bodies in the form of monolithic plates were used, as is indicated using the cross section of FIG. 12. In contrast, a crystal can be used as a solid state medium which has variously doped zones, as is indicated in FIG. 13. As an example, the FIG. 13 cross section is divided into a middle zone 26 and two outer edge zones 27. The two edge zones are less doped, for example by 0.8% atm with Nd:YAG, than the middle zone 26, which is, for example, 1.1% atm. The purpose of this is to achieve a homogeneous pumping power distribution in the pumping beam direction. The pumping power can be transported more strongly to the middle, i.e., middle zone 26. Because of this, greater homogeneity of pumping power can be achieved, leading, in turn, to improved thermo-optical properties. While the cross section depicted in FIG. 13 is divided into only three zones, a gradient-wise progression in doping by means of a larger number of variously doped zones can take place. Additionally, the layering direction of the individual, variously doped zones can be made to depend on the irradiation direction of pumping radiation 28.

Figure 14:
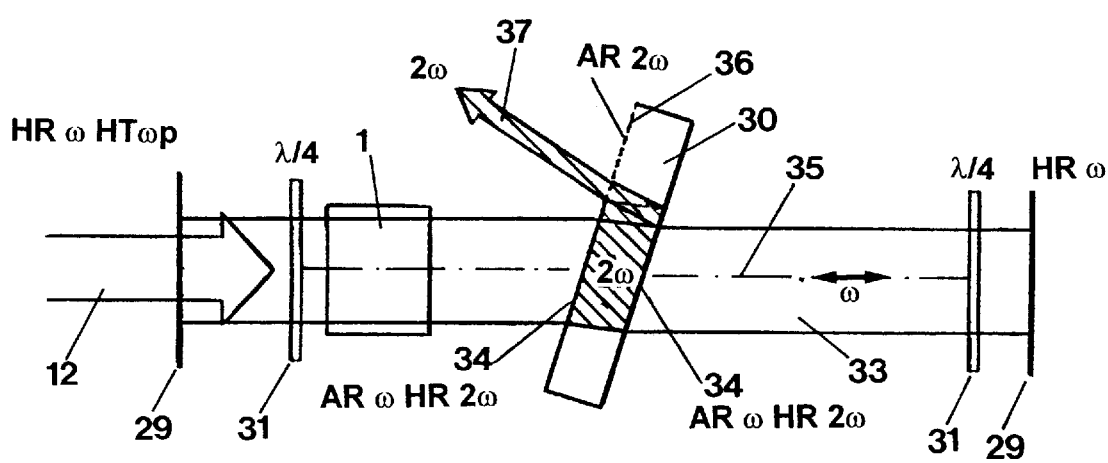
FIG. 14: a laser array in which the fundamental frequency is doubled by means of a non-linear crystal in connection with a stable resonator.

The use of laser arrays and laser beam sources in relation to the various applications requires, for one thing, a scaling of laser power. For another, it requires an adjustment of the frequency according to the specifications. The task is to double the ground wave radiation ($\omega$) which the active medium 1 emits, while exploiting the power scaling and homogenization measure, as it is described using FIGS. 1 to 13. To accomplish this, a resonator design is used as shown in FIG. 14. This linear resonator has two resonator end mirrors 29. Between them, the active medium, i.e., the solid body 1, is placed. Additionally, a doubler etalon 30 is placed in the ray path between the active medium 1 and the right-side resonator end mirror 29. Additionally, between the left resonator end mirror 29 and the solid state medium 1, there is a λ/4 plate 31 in the ray path. An additional λ/4 plate 31 is placed between the etalon 30 and the right resonator end mirror 29. By means of pumping radiation 12—preferably diode laser radiation—via the left resonator end mirror 29, pumping is done, and in indeed of such a type, that a an approximately rectangular volume of the solid state medium 1 is pumped. The active solid state medium 1, excited by means of the pumping radiation 12, emits ground wave radiation (ω) 33. As FIG. 14 indicates, the left resonator mirror 29 for ground wave radiation (ω) is highly reflecting, while it is highly transmitting for pumping radiation with the frequency (ωp). Just like the left resonator end mirror 29, the right resonator end mirror 29 is highly reflecting for the ground wave (ω). The doubling etalon 30 with its two longitudinal surfaces 34 is suitably inclined to the resonator axis 35 and to the ground wave radiation (ω). The two longitudinal surfaces 34 are designed to be anti-reflecting for the ground wave (ω), so that this ground wave radiation (ω) can enter the doubling etalon 30, while it is highly reflecting for the second harmonic (2ω). Because of these reflecting properties, the second harmonic (2ω) is multiply reflected within the doubling etalon 30, and is emitted to the upper side via an outlet window 36, which is anti-reflecting for the second harmonic (2ω), as working beam 37 (2ω). Through the two λ/4 plates 31, the polarization of the ground waves (ω) propagating to the left and right is so placed that the polarizations of these ground waves (ω) counterpropagating to the left and right are perpendicular to each other. With this λ/4 plate 31, the phase adjustment condition, such as only for the radiation circulating leftward, is met.

Figure 15:
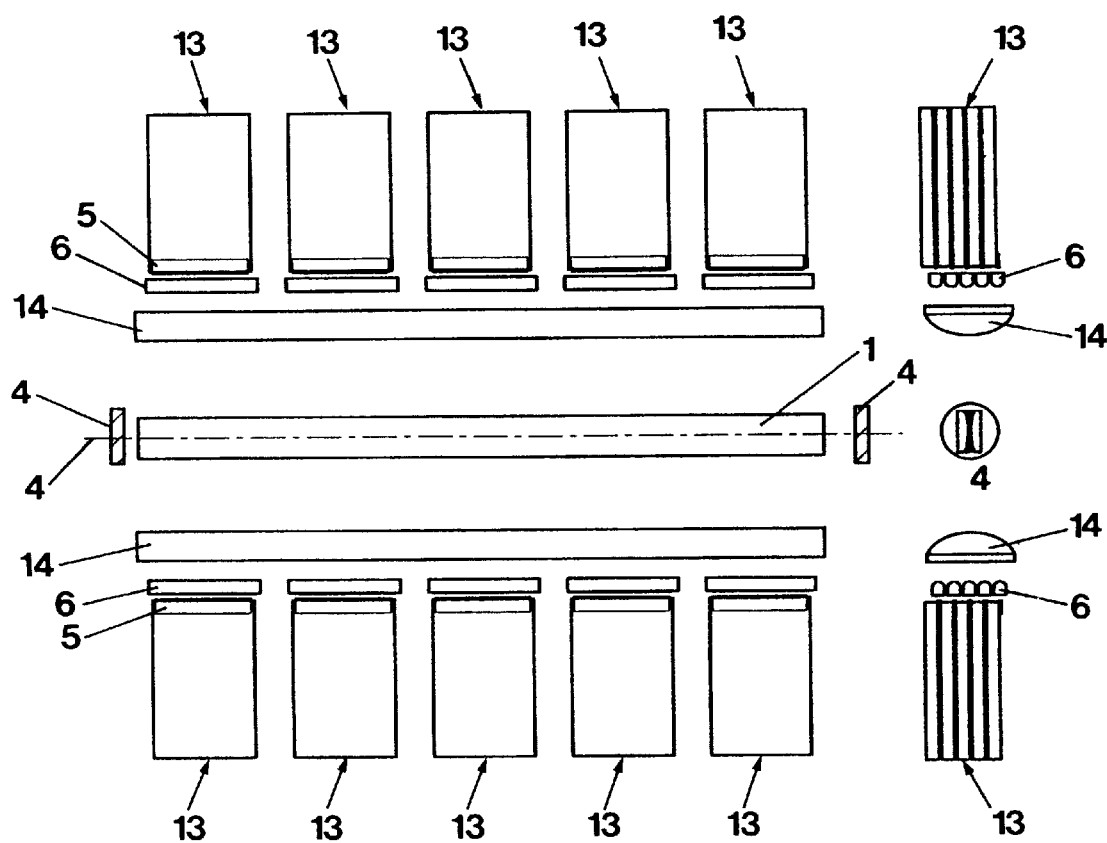
FIG. 15: an array which matches the FIG. 2 array in ground plan, whereby additionally stacked diode laser arrays are used in the form schematically depicted in FIG. 9.
Figure 16:
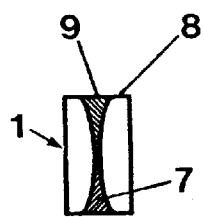
FIG. 16: a cross section through the solid state medium of FIG. 15 in the form of a monolithic plate, as is also schematically shown in FIG. 13. For this case, the excited volume is shown.
Figure 17:
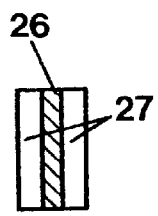
FIG. 17: an additional cross section through the solid state medium of FIG. 16, in the event that a sandwich-type plate design is used with a doping that is comparable to the embodiment form of FIG. 13.

FIG. 15 shows a design of a laser resonator that exhibits a combination of the principles of arrays that are provided for further enhancement of power. In the FIG. 15 arrangement, use can also be made of measures as they were previously explained using FIG. 13. They have the advantages described in connection with FIG. 13. The solid body is divided into different zones in sandwich fashion, as FIG. 17 shows. In FIG. 17, reference number 26 designates the active zone, while reference number 27 designates zones that are not active.

Figure 18:
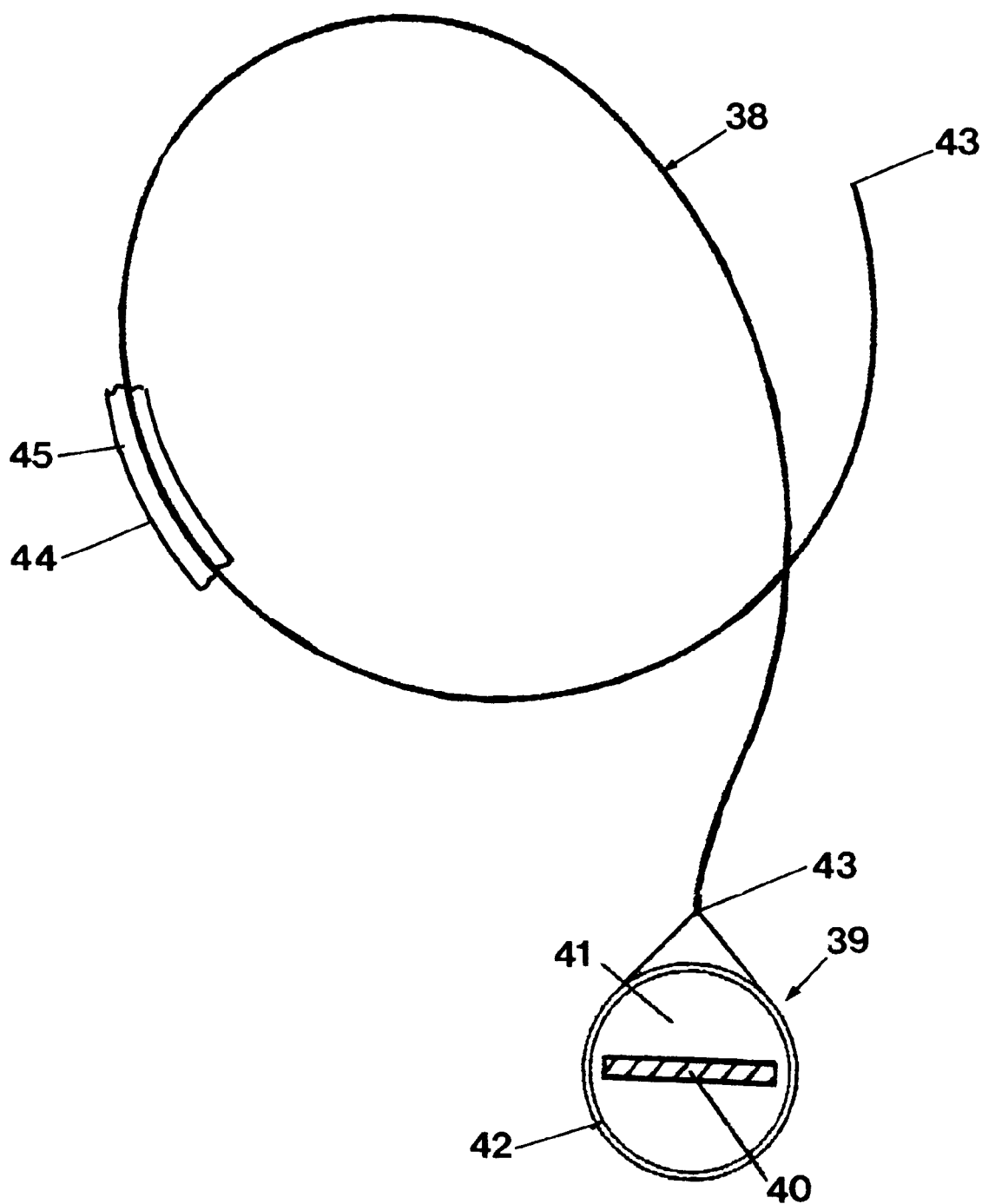
FIG. 18: schematic of an amplifier array which is in the form of a fiber or an optical waveguide. The optical waveguide cross section is schematically depicted in enlarged fashion at one end.

FIG. 18 shows an amplifier-laser which is designed as a fiber light guide 38. Like cross section 39 which is shown enlarged, the fiber essentially consists of three zones. In this example, the zones consist of- an active zone 40 with a rectangular cross section, a guide zone 41 for the pumping radiation, and a cover 42 that surrounds guide zone 41. In such an active medium in the form of an optical waveguide, the pumping radiation is coupled via the front-side ends 43. Arrays that generate pumping radiation are not depicted in FIG. 17. Around the pumping radiation, the refractive index decreases from the active zone 40 to the cover 42. To fabricate a resonator from this optical waveguide 38, the front-end sides 43 can be coated. For example, the one end for the laser radiation is provided with a highly reflective coating, while the other end obtains a partially reflective coating. The purpose of this is to couple or decouple laser radiation into the optical waveguide. The FIG. 18 array's advantage is that the large surface of the optical waveguide 38 is exploited for removing waste-energy heat. For this purpose, the optical waveguide 38 can be surrounded by a hose-shaped sheathing 44, which is shown in the form of a section. This is done in such a way that between the optical waveguide 38 and the sheathing 44, an annular space 45 is formed. If necessary, this can be supported by a range spacer which is not depicted in any greater detail. A cooling fluid such as water is filled into this space 45 and circulated if necessary. Such a cooling cover can be so designed that it takes on a waveguide function. For this purpose, the material of the cooling cover and/or the cooling fluid can be adjusted in relation to the refractive index, so that the refractive index decreases outward from the core and is less than the refractive index of the active zone 40.

Preferably, a Nd:YAG crystal will be used as the material for the active medium 1, as is described in FIGS. 1 to 16. In a wavelength range in the area of 806 nm, Nd:YAG exhibits a broad absorption band. The task is to achieve a high absorption efficiency within the shortest distance possible. To attain this, for solid state lasers that use a Nd:YAG body, diode laser radiation is used for pumping whose wavelength is about 806 nm. With invention-specific arrays, a long absorption section is advantageous to suppress parasitic oscillations, especially for end-on-pumped embodiment forms. Therefore, Nd:YAG lasers can be optically pumped at the weak absorption band around 870 nm. This pumping can be done, for example, by means of diode lasers. Additional advantages with pumping in the absorption band around 870 nm are that because of a small Stokes shift, high efficiency (and thus smaller thermal lenses) can be attained.

With the aid of the figures, various embodiment forms have been described as examples. Identical reference numbers are used in the individual embodiment forms for similar components. To that extent, the embodiments can be transferred to an embodiment form that analogously matches the other embodiment forms.

There has thus been shown and described a novel optically pumped amplifier, in particular a solid-state amplifier which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In an optically pumped amplifier, especially a solid state amplifier, having an amplification medium and an optical pumping array, wherein the pumping radiation is coupled into the amplification medium and is formed before coupling, and wherein the volume of the amplification medium is only partially pumped, and wherein the pumped volume of the amplification medium has an substantially rectangular cross section approximately perpendicular to the optical axis, wherein the relationship of the width to the height of the rectangular cross section of the pumped volume is greater than 1.8, wherein the amplification medium is located within a resonator and wherein the resonator is designed such that an unstable resonator is formed in the width of the pumped volume and that a stable resonator is formed in the height of the pumped volume.

2. Amplifier according to claim 1, wherein the relationship of the maximum to the minimum cross sectional width of the pumped volume perpendicular to the optical axis of the amplification medium is smaller than 1.5.

3. Amplifier according to claim 1, wherein the amplification medium is pumped from two opposite sides that are roughly perpendicular to the optical axis.

4. Amplifier according to claim 1, wherein the amplification medium is pumped from two opposite sides that are roughly parallel to the optical axis.

5. Amplifier according to claim 1, wherein the amplification medium is a solid state medium.

6. Amplifier according to claim 1, wherein a pump source of the pumping array is formed by one or more diode lasers.

7. Amplifier according to claim 1, wherein the pumping radiation is coupled to the amplification medium via one or more optical waveguides, to which a beam formation optical device is subsequently inserted.

8. Amplifier according to claim 1, wherein a pump source of the pumping array is formed by one or more solid state lasers, excimer lasers and/or ion lasers.

9. Amplifier according to claim 1, wherein the beam quality is homogenized over the cross section of the radiation emitted from the resonator by an optical array.

10. Amplifier according to claim 1, wherein the radiation emitted from the resonator is coupled to one or more optical waveguides.

11. Amplifier according to claim 1, wherein the radiation emitted from the amplification medium is converted by means of an etalon-shaped, non-linear medium in relation to the frequency.

12. Amplifier according to claim 1, wherein the solid state medium is made in the form of an optical waveguide which has a doped core as an amplification medium.

13. Amplifier according to claim 1, wherein the medium is pumped with radiation whose wavelength at least partially matches the weak absorption line of the medium.

14. Amplifier according to claim 1, wherein the resonator is designed such that in the width of the pumped volume an unstable resonator is formed in off-axis-configuration.

15. Amplifier according to claim 5, wherein the solid state medium is divided into different zones, with the zones being doped in varying concentration.

16. Amplifier according to claim 15, wherein the doping decreases from zone to zone toward the pumping source.

17. Amplifier according to claim 15, wherein the solid state medium is pumped in layered zones in such a way that the amplification medium has several volumes that are approximately rectangular and in cross section are perpendicular to the optical axis.

18. Amplifier according to claim 15, wherein at least two solid state media are stacked while placing a cooling device in between.

19. Amplifier according to claim 18, wherein several diode laser billets are placed next to each other.

20. Amplifier according to claim 6, wherein several diode lasers of a pump source are combined to form at least one line of a diode laser billet.

21. Amplifier according to claim 20, wherein the pumping radiation of the laser diode billet is collimated in linear fashion and/or focused by means of a cylindrical lens and coupled to the amplification medium.

22. Amplifier according to claim 21, wherein several diode laser billets are combined atop one another into a field array, whereby the pumping radiation, which is collimated via the particular cylindrical lenses, is coupled to an additional, focused cylindrical lens, from which it is then coupled into the amplification medium.

23. Amplifier according to claim 11, wherein the resonator is designed so that in the width of the pumped volume, an off-axis, unstable resonator is formed, and that in the height of the pumped volume, a stable resonator is formed and wherein the etalon-shaped medium is placed within the resonator.

24. Amplifier according to claim 12, wherein the core in cross section has at least one rectangular doped zone.

25. Amplifier according to claim 12, wherein the optical waveguide is mounted on a cooling body or between two cooling bodies, and is in thermal contact with the cooling body or bodies.

26. Amplifier according to claim 25, wherein grooves are formed in the cooling body or bodies, and the optical waveguide is embedded in the grooves.

27. Amplifier according to claim 12, wherein the optical waveguide is placed in a cooling chamber.

28. Amplifier according to claim 27, wherein the cooling chamber is closed.

29. Amplifier according to claim 27, wherein the cooling chamber is filled with coolant.

30. Amplifier according to claim 29, wherein the coolant is caused to flow through the hose.

31. Amplifier according to claim 12, wherein the optical waveguide is placed in a hose, with a coolant filled in between the hose and the optical waveguide.

32. Amplifier according to claim 31, wherein the optical waveguide within the cooling hose is kept roughly concentric to the cooling hose by means of spacers.

33. Amplifier according to claim 13, wherein the solid state medium is neodymium-doped and pumped with a pumping radiation whose wavelength is about 870 nm.

34. Amplifier according to claim 12, wherein the core is doped as an amplification medium with Yb or Nd ions.

35. Amplifier according to claim 12, wherein the optical waveguide has a cover surrounding the core, whereby pumping radiation is coupled to at least one front end of the cover and of the core, and within the mantle and the core the ions in the core are excited and guided.

36. Amplifier according to claim 12, wherein a resonator is formed around the optical waveguide.

37. Amplifier according to claim 12, wherein the resonator mirror is placed on both front surfaces of the optical waveguide.

* * * * *